(12) United States Patent
Kalinin et al.

(10) Patent No.: US 7,292,768 B1
(45) Date of Patent: Nov. 6, 2007

(54) ULTRAHIGH DENSITY FERROELECTRIC STORAGE AND LITHOGRAPHY BY HIGH ORDER FERROIC SWITCHING

(75) Inventors: Sergei V. Kalinin, Knoxville, TN (US); Arthur P. Baddorf, Knoxville, TN (US); Ho Nyung Lee, Oak Ridge, TN (US); Junsoo Shin, Knoxville, TN (US); Alexei L. Gruverman, Raleigh, NC (US); Edgar Karapetian, Malden, MA (US); Mark Kachanov, Arlington, MA (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 11/409,740

(22) Filed: Apr. 24, 2006

(51) Int. Cl.
*G02B 6/00* (2006.01)
*G11B 9/00* (2006.01)

(52) U.S. Cl. ...................... 385/147; 369/126
(58) Field of Classification Search ................. 369/126
See application file for complete search history.

(56) References Cited

OTHER PUBLICATIONS

Abplanalp et al, "Higher Order Ferroic Switching by Scanning Force Microsopy", Physical Review Letters, vol. 86, No. 25, 2001.*

Abplanalp et al, "High Order Ferroic Switching by Scanning Force Microscopy" Physical Review Letters, vol. 86, No. 25, Jun. 2001.

Kohlstedt et al, "Size Effects on polarization in epitaxial ferroelectric films and the concept of ferroelectric tunnel junctions including first results"Mat.Res.Symp.Proc.vol. 688, 2002.

Morita et al, "Polarization reversal anti-parallel to the applied electric field observed using a scanning nonlinear dielectric microscopy" Applied Physics Letters, vol. 84, No. 2, Jan. 2004.

* cited by examiner

*Primary Examiner*—Michelle Connelly-Cushwa
*Assistant Examiner*—Chris H. Chu
(74) *Attorney, Agent, or Firm*—Michael E. McKee

(57) ABSTRACT

A method for switching the direction of polarization in a relatively small domain in a thin-film ferroelectric material whose direction of polarization is oriented normal to the surface of the material involves a step of moving an electrically-chargeable tip into contact with the surface of the ferroelectric material so that the direction of polarization in a region adjacent the tip becomes oriented in a preselected direction relative to the surface of the ferroelectric material. The tip is then pressed against the surface of the ferroelectric material so that the direction of polarization of the ferroelectric material within the area of the ferroelectric material in contact with the tip is reversed under the combined effect of the compressive influence of the tip and electric bias.

3 Claims, 5 Drawing Sheets

ULTRAHIGH DENSITY FERROELECTRIC STORAGE AND LITHOGRAPHY BY HIGH ORDER FERROIC SWITCHING

This invention was made with Government support under Contract No. DE-ACO5-000R22725 awarded by the U.S. Department of Energy to UT-Battelle, LLC, and the Government has certain rights in the invention.

BACKGROUND OF THE INVENTION

This invention relates generally to the switching of polarization in a ferroelectric structure and relates, more particularly, to the switching of the direction of polarization in a thin-film ferroelectric structure by way of an electrically-chargeable conducting tip that can also exert local force.

The polarization of ferroelectric material in a thin film ferroelectric structure can be switched with the cantilevered and conductive tip of an Atomic Force Microscopy (AFM) instrument by electrically charging the tip and then moving the tip into contact with the surface of the ferroelectric structure. Such action exemplifies a technique for switching a direction of polarization of ferroelectric material in a ferroelectric data storage device. For example, if the direction of polarization of the ferroelectric material in a ferroelectric data storage device store information corresponding with either a or a "+" or either a "−" or a "0", by bringing an appropriately-charged tip of an AFM into contact with the surface of the memory device, the direction of polarization of the ferroelectric material is reversed so that the information becomes either a "−" or a "+" or either a "0" or a "1".

Heretofore, however, the region (i.e. domain) of the ferroelectric material which is affected, or switched, by the electrically-charged tip of the AFM is appreciably larger than the area of contact between the AFM tip and the surface of the ferroelectric structure. Such a consequence is believed to be due, at least in part, to the proximity between the portions of the surface of the ferroelectric structure which are not in contact with the AFM tip and the electrostatic fields which surround the electrically-charged tip. In any event, these long range interactions limit the minimal domain size that can be achieved during a switching operation performed with the AFM tip. Since domain size directly controls the amount of information which can be stored in a ferroelectric structure, it would be desirable to provide a scheme for switching the direction of polarization in a ferroelectric material wherein only a relatively small domain within the ferroelectric material is affected.

Accordingly, it is an object of the present invention to provide a new and improved method for switching the direction of polarization in a ferroelectric material with an electrically-chargeable tip wherein the size of the affected domain is relatively small.

Another object of the present invention is to provide such a method wherein the size of a domain affected by the electrically-chargeable tip corresponds to about the size of the surface area of the ferroelectric material contacted by the tip.

Still another object of the present invention is to provide such a method for inducing high order ferroelectric switching.

Yet another object of the present invention is to provide such a method that allows for the creation and detection of domains at nanometer length scale and whose domain size can be determined quantitatively.

A further object of the present invention is to provide such a method which is well-suited for use in applications such as may involve ultrahigh density storage, ferroelectric lithography or nanostructure fabrication.

A still further object of the present invention is to provide such a method which is relatively easy to perform yet effective in operation.

SUMMARY OF THE INVENTION

This invention resides in a method for switching the direction of polarization in a thin-film ferroelectric material whose direction of polarization is oriented normal to the surface of the material.

The method includes the steps of moving an electrically-chargeable tip into contact with the surface of the ferroelectric material so that the direction of electric field in a region adjacent the tip is biased in a preselected direction relative to the surface of the ferroelectric material. The tip is then pressed against the surface of the ferroelectric material so that the direction of polarization of the ferroelectric material within the area of the ferroelectric material in contact with the tip is reversed under the action of electric field and the compressive influence of the tip.

BRIEF DESCRIPTION OF THE DRAWINGS

FIG. 4a is a second example of the variable mesh size pattern written by applying electric field to the tip according to the pattern in FIG. 3a.

FIG. 6a is a scanning probe microscopy image of written areas of a ferroelectric thin film possessing an equal size mesh written pattern which has a different mesh size from that of FIG. 5a.

FIG. 6b is a Fourier transform image corresponding to the written image of FIG. 6a.

DETAILED DESCRIPTION OF AN ILLUSTRATIVE EMBODIMENT

Figure 1:
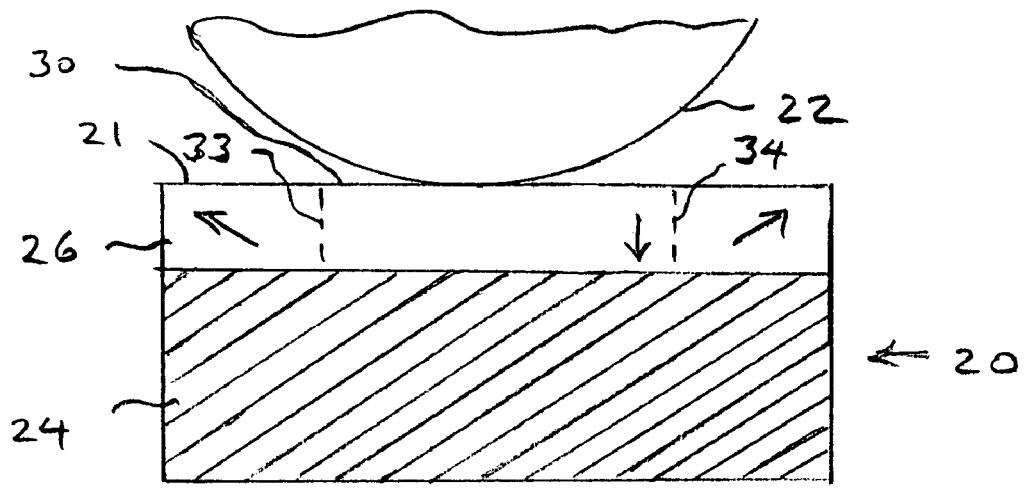
FIG. 1 is a cross-sectional view illustrating schematically the switching of the direction of polarization in a ferroelectric material with a cantilevered Atomic Force Microscopy (AFM) tip in accordance with prior art methodology.

Turning now to the drawings in greater detail and considering first FIG. 1, there is illustrated a schematic representation of a ferroelectric structure, generally indicated 20, embodying a ferroelectric material whose direction of polarization can be switched with a cantilevered Atomic Force Microsocopy (AFM) tip 22 which is mounted for movement toward and away from the surface, indicated 21, of the ferroelectric structure 20 in accordance with known techniques. In this connection, the ferroelectric structure 20 includes a suitable conductive substrate 24 (e.g. silicon, germanium platinized silicon or non-ferroelectric oxide) and a thin film layer 26 of ferroelectric material which has been built up upon the substrate 24.

The material of the ferroelectric layer 26 can be any of a number of known ferroelectric materials, such as an oxide perovskite or a ferroelectric polymer. In any event, however, the polarization of the ferroelectric layer 26 (before the tip 22, when electrically-charged, is moved into contact with its surface 21) is directed along a path which is normal to the underlying substrate 24. More specifically and in the FIG. 1 example (and before the tip 22 is moved into contact with the surface thereof), the direction of polarization of the ferroelectric layer 26 is directed away from the substrate 24, and the AFM tip 22 is situated on the side of the ferroelectric layer 26 opposite the substrate 24. When embodied in a ferroelectric data storage device, such a polarization direction can designate a binary value such as a "+" or "−" or a "1" or "0" if oriented in a corresponding upward or downward direction.

By inducing an appropriate (i.e. switching) bias within the AFM tip 22 and then moving the tip 22 (downwardly as viewed in FIG. 1) toward the structure 20 and into contact with the surface 21, the direction of polarization of the region, indicated 30, of the ferroelectric layer 24 positioned in relatively close proximity to the conducting tip 22 is switched to the opposite direction. This region 30, whose shape is circular as viewed downwardly in FIG. 1 and whose direction of polarization is switched by the electrically-charged tip 22 is indicated in FIG. 1 as the region of the ferroelectric layer 26 situated between the dotted lines 33 and 34 of FIG. 1.

It follows that when a non-switching bias is applied to the tip 22 and the tip 22 is moved into contact with the surface 21, the direction of polarity of the region 30 remains what it was before the contact. Therefore, by controlling the electrical bias applied to the tip 22 and moving the tip 22 into contact with the surface 21, the direction of polarization of the region 30 can be controlled or, in other words, selected to be directed upwardly or downwardly.

The aforedescribed FIG. 1 technique involved in switching the direction of polarization of a region of ferroelectric material with an electrically-charged AFM tip 22 is known and represents a pure ferroelectric switching process. Noteworthy, however, in the FIG. 1 example is the relatively large size of the region 30 of the ferroelectric layer 26 which is switched, or affected, by the tip 22. Such a region 30 extends appreciably outwardly beyond, i.e. outboard of, the area of contact between the tip 22 and the surface 21 of the ferroelectric layer 26. The switching of such a broad area is believed to be due, at least in part, to the electrostatic field produced by the portions of the tip 22 which are proximate to, but not in contact with, the areas of the surface 21 which are outboard of the area of contact between the tip 22 and the surface 21. Such an effect results in a domain region 30 of switchable polarity which possesses a relatively large size and has been heretofore believed to limit the minimal achievable size of a domain region. Of course, if the minimal achievable domain size is limited, then the density of an achievable domain pattern for information storage, ferroelectric lithography and nanostructure fabrication would be limited, as well.

As mentioned above, the aforedescribed FIG. 1 example of switching in ferroelectric thin films by an AFM tip-generated electrostatic field represents a pure ferroelectric switching process. This is well-documented in literature and is considered as a prospective technology for ultra-high density non-volatile ferroelectric storage. One of the strongest motivations for a ferroelectric memory device is the small stable ferroelectric domain size, which has been experimentally shown to be in the about 30 nm range, corresponding to about 1 Tbit/square inch storage density. Combined with the extremely long lifetimes of ferroelectric domains, this extremely high storage density offers many opportunities for both non-volatile FeRAM devices and long-term storage technology. The minimum stable domain size is expected to decrease to several nanometers in films of thickness 2 to 10 unit cells, a value which approaches the theoretical atomic limit for storage density.

Figure 2:
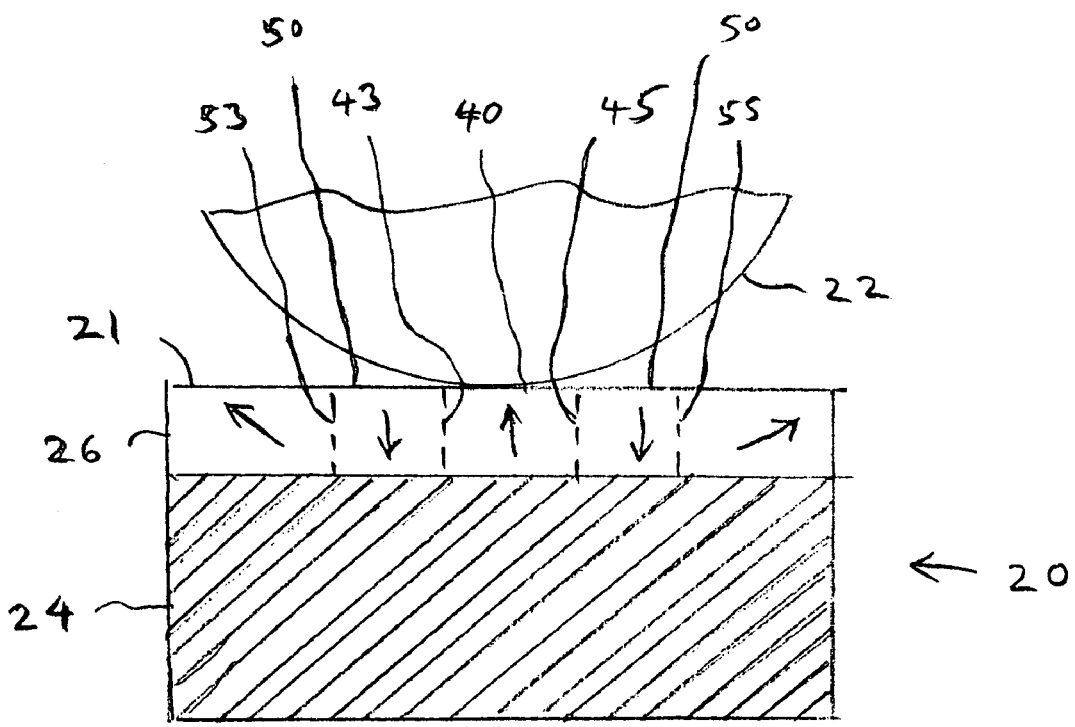
FIG. 2 is a view similar to that of FIG. 1 but showing schematically the switching of the direction of polarization in a ferroelectric material with an AFM tip in accordance with an embodiment of the method of the prior art.

With reference to FIG. 2, there is illustrated a switching of direction of polarization in selected regions of the ferroelectric layer 26 of the structure 20 in accordance with an embodiment of the method of the present invention. In particular, the regions of the ferroelectric layer 26 effected by an electrically-charged AFM tip 22 in accordance with the method of the present invention include the circular (as viewed downwardly in FIG. 2) region 40 which corresponds with about the area contacted by the (lower) contacting end of the tip 22 and the region 50 arranged concentrically about the region 40. Within the FIG. 2 view, the region 40 is the region of the ferroelectric layer 26 which is illustrated as being situated between the dotted lines 43 and 45 of FIG. 2 while the region 50 is the region of the ferroelectric layer 26 which is illustrated as including portions which are situated between the dotted lines 53 and 43 and between the dotted lines 45 and 55.

The method of the present invention includes the step of moving an electrically-charged tip 22 into engagement with the surface 21 of the ferroelectric layer 26 and pressing the tip 22 against the surface 21 so as to apply compressive forces to the surface 21. Such a step effects two actions. The first action is to orient, by virtue of the electrostatic fields surrounding the tip 22, the direction of polarization (i.e. electric field) of the totality of the regions 40 and 50 into a predetermined direction (i.e. either upwardly toward the surface 21 or downwardly away from the surface 21). As mentioned above in connection with the FIG. 1 example, by controlling the charge within the tip 22, the direction of polarity of the totality of the regions 40 and 50 can be oriented along a preselected direction. Thus, this first action is not unlike that described in connection with the FIG. 1 example.

However, the second action relates to the effects experienced within the ferroelectric layer 26 by the combined effects of the electric field surrounding the tip 22 and the compression of the tip 22 against the surface 21. In particular, the ferroelectroelasticity of the ferroelectric layer 26 effects a reversal in direction of polarity (i.e. electric field) within the region 40 so that the resultant direction of polarization within the region 40 is opposite the direction of polarization established by the electrostatic fields surrounding the tip 22. Consequently and due to the combined effects of the electrostatic fields surrounding the tip 22 and the compression exerted upon the surface 21, the direction of polarization within the region 40 is opposite the direction of polarization of the concentrically-arranged region 50. Since the area of the region 40, as measured over the surface 21, is about equal to or smaller than the area of contact between the tip 22 and the surface 21, the size of the region 40 (when considered as a domain) can be about as small as the end of the tip 22 and is advantageous in this respect. Furthermore and because the end of the tip 22 can be made to be very small, this method allows the creation and detection of domains of the order of a few nanometers.

This invention is an approach for ultrahigh density ferroelectric domain patterning for applications such as high density information storage, nearly atomic density recording, ferroelectroelastic lithography, and nanostructure fabrication. Moreover, the method of this invention can be used for high order ferroic (ferroelastroelastic) switching to achieve high information densities for ferroelectric recording, to facilitate control over the written domain size, and to perform the write operation in a single step, combining the two steps (erasing and writing) required for the low order (ferroelectric) switching.

Possible alternative versions of the invention include using ferroelectroelastic lithography to deposit metallic or semiconducting nanoparticles on the patterned domain structure, or selective etching following patterning of the ferroelectric surface resulting in topographic variation of dissimilar domains.

Applicants have performed an in-depth analysis of the switching mechanism and have shown that for ferroelectroelastic switching, the concentration of elastic field, which exists only in the contact area, allows creation of such smaller ferroelectric domains and more precise control over domain size. Created ferroelectroelastic domains (e.g. the region 40 of the FIG. 2 example) are opposite in sign to the larger ferroelectric domain (e.g. region 50 of the FIG. 2 example), so that previously stored information can be deleted and a new stored domain pattern can be created in a single writing step.

Applicants believe that further developments in this field require the existence of an unambiguous standard that allows the domain size created by methods, such as the method described herein, to be determined quantitatively.

One known standard, or read-out scheme, is based upon the use of Piezoresponse Force Microscopy. In this technique, a periodic base signal, $V_{tip}=V_{dc}+V_{ac} \sin \omega t$, is applied to the AFM tip and the electromechanical surface displacement, defined as $A=A_1 \sin(\omega t+\phi_1)$, is measured by using a standard AFM detection scheme. The measured quantity is the piezoresponse signal, defined as $PR=A_{1w} \sin \phi_1/V_{ac}$ which is directly related to the local polarization orientation. For domains oriented upwardly, $PR=+A_{1w}/V_{ac}=+d_{eff}$ (wherein $d_{eff}$ is the effective piezoelectric response of the material), and for domains oriented downwardly, $PR=-d_{eff}$, so that a clear contrast can be provided between the upwardly and downwardly-oriented domains. A number of alternative schemes for measurement of local polarization orientation can exist, based on capacitive, electro-optical, or other effects.

Figure 3A:
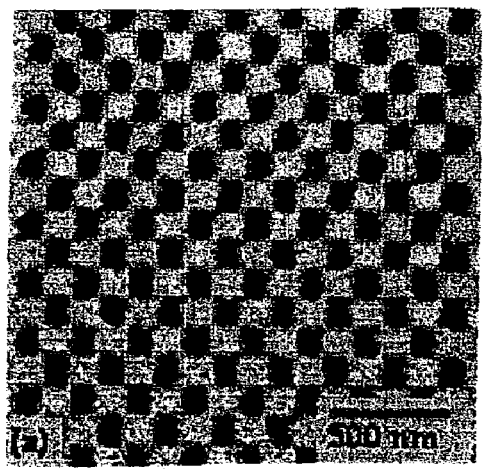
FIG. 3a is a variable mesh size calibration writing pattern according to which positive and negative regions are written by a Scanning Probe Microscope (SPM), of which the ATM is one example, where writing is performed by applying a bias to the tip (conventional approach) or simultaneous action of the electric field and mechanical stress (proposed approach). Variation of the mesh size in both (x and y-coordinate) directions allows the transfer of contrast to the surface to be estimated by creating domains of different sizes.

Along the lines of the foregoing, applicants have developed their own standard for read-write and read processes. A read-write standard, referred to herein as a variable mesh size standard, is for determining the read-write resolution of thin film memory storage structures possessing domains which have been written with the method of the present invention. In this connection, there is illustrated in FIG. 3a a representation of an idealized signal image, i.e., the original writing pattern of scanning probe microscopy, corresponding to ideal obtainable image. Within this FIG. 3a image, the black areas indicate the areas of negative poling whereas the bright areas indicate the areas of positive poling. Furthermore and due to the nature of the illustrated patterns, the size of the written domains vary in size across the image and more, particularly, the size of the written domains decrease in size as a path is traced across the image from the upper right-hand corner (as viewed in FIG. 3a) toward the lower left-hand corner.

Figure 3B:
FIG. 3b is a Fourier transform image of the read domains which were written by the application of constant electric bias to the tip according to the pattern of FIG. 3a. While the largest domains are reliably reproduced, the small domains are not seen, illustrating the concept of minimal written domain size.
Figure 3C:
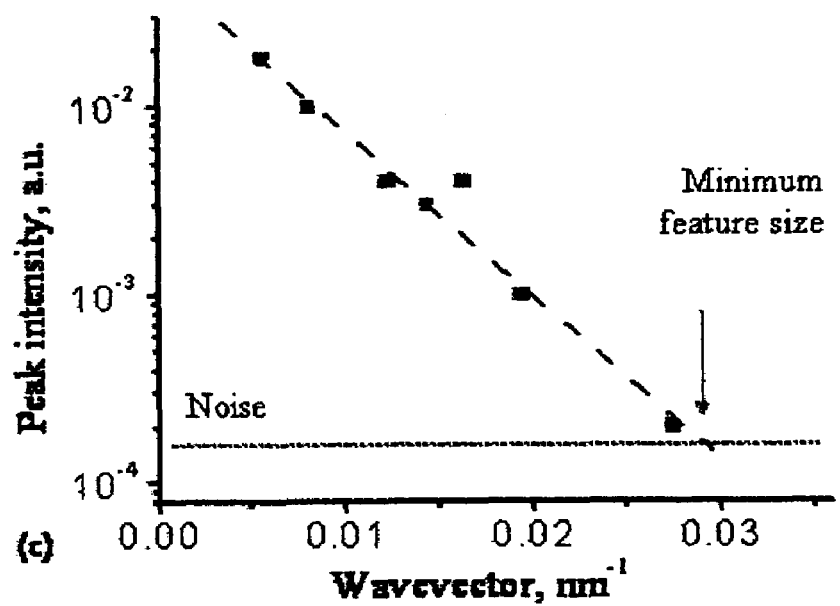
FIG. 3c illustrates the read-out contrast variation along the dotted line in FIG. 3b.

There is illustrated in FIG. 3b an image of the read pattern of the FIG. 3a written pattern, depicting the ferroelectric domains which have been written within a ferroelectric thin film. It can be seen from this FIG. 3a image that the larger domain sizes (i.e. those nearest the upper right-hand corner) translated almost exactly (e.g. there is substantially a one-for-one-correspondence between the written pattern of FIG. 3a and the imaged pattern of FIG. 3b) but the smaller domain sizes (i.e. those nearest the lower right-hand corner) did not reproduce. The smallest domains which do reproduce are representative of the minimum domain size achievable in the writing and reading process.

Figure 4A:
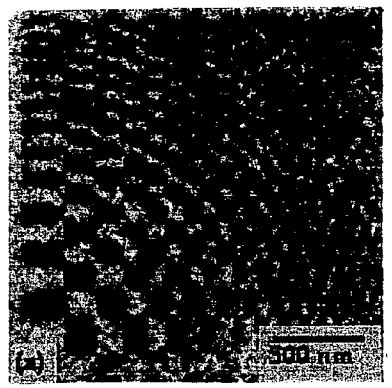
Figure 4B:
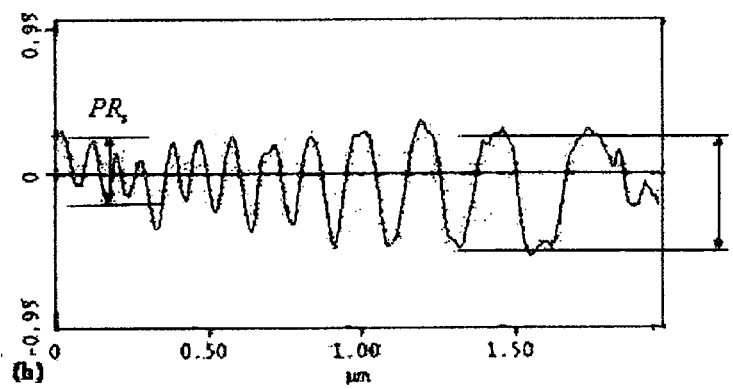
FIG. 4b is a line profile corresponding to the variable mesh size pattern of FIG. 4a. This variable mesh size standard allows one to determine a minimal size of the domain that can be written by the tip.

This behavior is further illustrated in FIGS. 4a and 4b, which establishes quantitative criterion as to which domains are still visible, thus providing a definition of minimal domain in the read-write process. Here, the domain is readable if, for example, the effective signal variation inside the domain is no less than about fifty percent of the signal variation between the larger domains. It is believed that this approach provides an acceptable method of quantitatively defining the writing and reading resolution in the ferroelectric data storage process and is advantageous in this respect.

While our above-described variable mesh standard permits the effective total resolution of a writing and reading process to be determined, we now describe how the resolution of the reading process can be determined independently with the use of Fourier transforms plots. In this connection, we utilize the fact that the domain wall width in ferroelectric perovskites is of the order of 1-2 unit cell parameters, i.e. atomically sharp. Thus, domain wall width is much smaller than the effective resolution of the technique and thus the former is an effective calibration standard for reading resolution. To determine the domain wall width, we use the standard based on the checkerboard writing pattern illustrated in FIG. 5a.

Figure 5A:
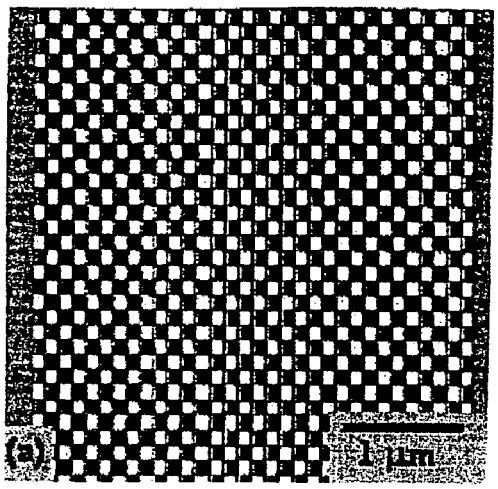
FIG. 5a is a constant mesh size calibration writing pattern according to which positive and negative regions are written by an SPM, where writing is performed by applying a bias to the tip or simultaneous action of the electric field and mechanical stress.
Figure 5B:
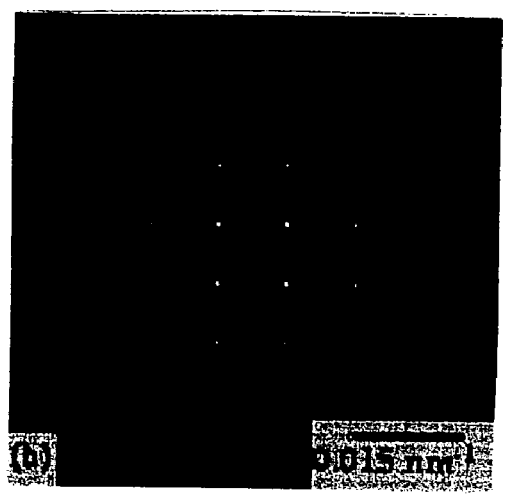
FIG. 5b is a Fourier transform image corresponding to the written image of FIG. 5a. All Fourier harmonic components are seen, indicative of "infinitely high" resolution of the writing pattern.
Figure 5C:
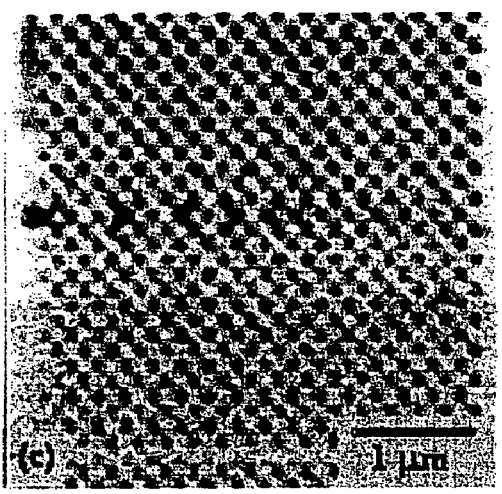
FIG. 5c is a scanning probe microscopy image of the read domains which were written by application of constant electric bias to the tip according to the pattern of FIG. 5a. Note that the FIG. 5c image is less sharp than that of FIG. 5a, thus illustrating the effect of finite resolution of a microscope.
Figure 5D:
FIG. 5d is a Fourier transform image corresponding to the written image of FIG. 5c. Only several Fourier harmonic components are seen, indicative of finite resolution of a read-out pattern.

More specifically, a checkerboard writing pattern is shown in FIG. 5a and a plot of the Fourier transform which corresponds to the FIG. 5a pattern is shown in FIG. 5b. Note that all Fourier components are seen, indicative of "infinitely high" resolution of the image with absolutely abrupt interfaces. After the writing pattern illustrated in FIG. 5a, subsequent read-out by the SPM yields the pattern of FIG. 5c. The Fourier transform of experimental read-out pattern depicted in FIG. 5c is illustrated in FIG. 5d. Now only several low-order peaks are seen in Fourier transform, indicative of finite resolution of the experimental image, indicative of finite resolution of the experimental image. The distance corresponding to the most outward Fourier component defines the minimum feature size readable by the technique.

Figure 6A:
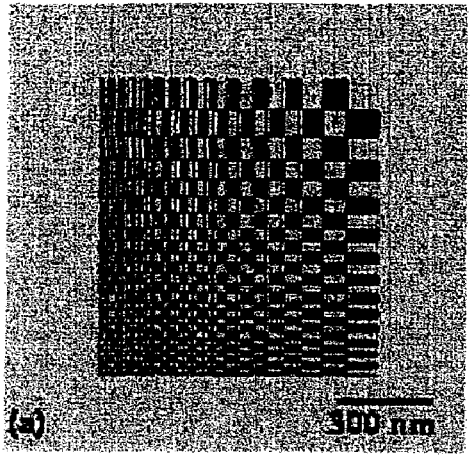
Figure 6B:
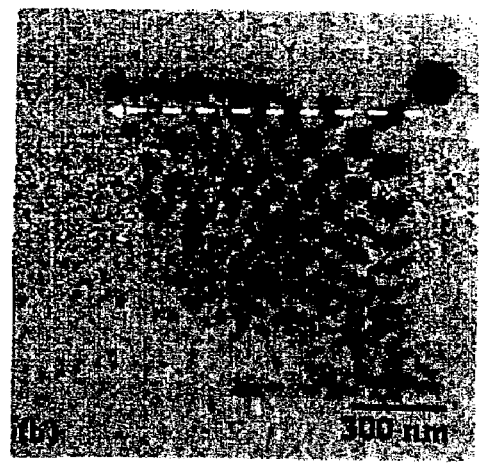
Figure 6C:
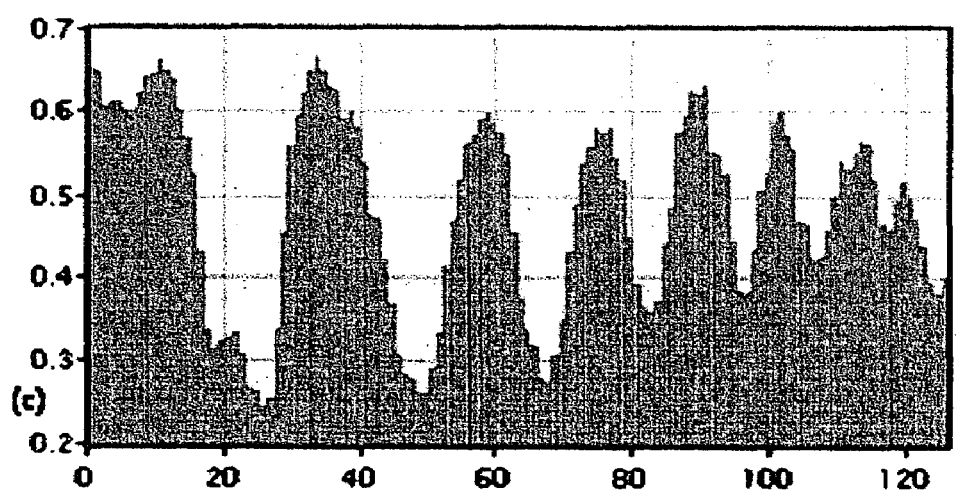
FIG. 6c is a plot of the wave vector dependence of the average Fourier peak intensity. The minimum domain size detectable by the microscope is defined as an inverse wave vector for which peak intensity is equal to or lower than the noise level of the system.

This approach is further illustrated in FIGS. 6a, 6b and 6c illustrating the domain pattern, corresponding Fourier transform, and wave vector dependence of the average peak intensity, respectively. The inverse wavevector for which Fourier peak intensity becomes lower than the noise level defines the minimal size.

To summarize, therefore, this standard involving plots of Fourier transforms which correspond to the writing pattern of a ferroelectric storage structure defines the reading resolution for the technique as a necessary corollary to reading and writing resolution described above.

It will be understood that numerous modifications and substitutions can be had to the aforedescribed embodiment without departing from the spirit of the invention. Accordingly, the aforedescribed embodiment is intended for the purpose of illustration and not as limitation.

The invention claimed is:

1. A method for switching the direction of polarization in a thin-film ferroelectric material whose direction of polarization is oriented normal to the surface of the material, the method comprising the steps of:

moving an electrically-chargeable tip into contact with the surface of the ferroelectric material so that the direction of polarization in a region adjacent the tip is biased in a preselected direction relative to the surface of the ferroelectric material and pressing the tip against the surface of the ferroelectric material so that the direction of polarity of the ferroelectric material within the area of the ferroelectric material in contact with the tip is reversed from the preselected direction in which the polarization is biased under the combined effect of the compressive influence of the tip and electric bias and to create a domain of nanometer scale.

2. A method for switching the direction of polarization in a thin-film ferroelectric material with an electrically-chargeable tip which is moveable toward and away from the surface of the ferroelectric material, the method comprising the steps of:

moving the electrically-chargeable tip into contact with the surface of the ferroelectric material to induce within a region of the ferroelectric material which is proximate to the electrically-chargeable tip a preselected direction of polarization and which direction is oriented normal to the surface of the ferroelectric material and then depressing the electrically-chargeable tip against the surface of the ferroelectric material so that within an area of said region of the ferroelectric material, the direction of polarization of the ferroelectric material is reversed from the induced preselected direction of polarization and to create a domain of nanometer scale.

3. A method for switching the direction of polarization in a thin-film ferroelectric material embodied within a ferroelectric structure and whose direction of polarization is oriented normal to the surface of the material, the method comprising the steps of:

moving an electrically-chargeable tip into compressive contact with the surface of the ferroelectric material so that the direction of polarization in a region adjacent the tip is biased in a preselected direction relative to the surface of the ferroelectric material and so that the direction of polarization of the ferroelectric material within an area of said region and which is in contact with the tip is oriented opposite the preselected direction of polarization bias in said region and to create a domain of nanometer scale.

* * * * *